(12) United States Patent
Ohashi et al.

(10) Patent No.: US 12,508,677 B2
(45) Date of Patent: Dec. 30, 2025

(54) SOLDER PASTE AND BONDED STRUCTURE

(71) Applicant: Panasonic Intellectual Property Management Co., Ltd., Osaka (JP)

(72) Inventors: Naomichi Ohashi, Hyogo (JP); Yasuhiro Okawa, Osaka (JP); Koso Matsuno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 413 days.

(21) Appl. No.: 18/346,297

(22) Filed: Jul. 3, 2023

(65) Prior Publication Data

US 2023/0347454 A1 Nov. 2, 2023

Related U.S. Application Data

(63) Continuation of application No. PCT/JP2021/044189, filed on Dec. 2, 2021.

(30) Foreign Application Priority Data

Jan. 18, 2021 (JP) .................... 2021-005898

(51) Int. Cl.
  *B23K 35/362* (2006.01)
  *B23K 35/36* (2006.01)
  *B23K 101/36* (2006.01)

(52) U.S. Cl.
  CPC ........ *B23K 35/362* (2013.01); *B23K 35/3613* (2013.01); *B23K 2101/36* (2018.08)

(58) Field of Classification Search
  CPC .............. B23K 35/362; B23K 35/3613; B23K 2101/36; B23K 35/3618; B23K 35/025;
  (Continued)

(56) References Cited

FOREIGN PATENT DOCUMENTS

| JP | 63-180396 | 7/1988 |
| JP | 05-318176 | 12/1993 |

OTHER PUBLICATIONS

International Search Report of PCT application No. PCT/JP2021/044189 dated Feb. 22, 2022.

*Primary Examiner* — Adil A. Siddiqui
(74) *Attorney, Agent, or Firm* — Wenderoth, Lind & Ponack, L.L.P.

(57) ABSTRACT

A solder paste including at least two types of solder powders each containing at least two types of metal elements has an average free energy of oxide formation of the at least two types of solder powders on a molar basis of −490 kJ/mol or more, the average free energy of oxide formation being a sum of products ($A_i \times B_i$) of a molar ratio ($A_i$) of each of the at least two types of metal elements (i) based on all the at least two types of metal elements constituting the at least two types of solder powders included in the solder paste and a free energy ($B_i$ kJ/mol) of oxide formation of the each of the at least two types of metal elements, and an average melting point of the at least two types of solder powders on a mass basis of 121° C. or lower, the average melting point being a sum of products ($C_j \times D_j$) of a mass ratio ($C_j$) of each of the at least two types of solder powders (j) based on a total mass of the at least two types of solder powders included in the solder paste and a melting point ($D_j$° C.) of the each of the at least two types of solder powders.

7 Claims, 1 Drawing Sheet

| | FIRST SOLDER POWDER PART BY MASS | SECOND SOLDER POWDER PART BY MASS | AVERAGE FREE ENERGY (kJ/mol) OF OXIDE FORMATION OF SOLDER POWDER | SOLDER POWDER AVERAGE MELTING POINT (°C) | VISCOSITY CHANGE EVALUATION | MELTABILITY EVALUATION |
|---|---|---|---|---|---|---|
| EXAMPLE 1 | 30 | 70 | −462.2 | 108.9 | A | A |
| EXAMPLE 2 | 15 | 85 | −484.0 | 102.5 | B | A |
| EXAMPLE 3 | 50 | 50 | −432.9 | 117.5 | A | B |
| COMPARATIVE EXAMPLE 1 | 10 | 90 | −491.3 | 100.3 | C | A |
| COMPARATIVE EXAMPLE 2 | 60 | 40 | −418.1 | 121.8 | A | C |
| EXAMPLE 4 | 10 | 90 | −472.3 | 108.3 | B | B |
| EXAMPLE 5 | 15 | 85 | −456.3 | 114.5 | A | B |
| EXAMPLE 6 | 20 | 80 | −440.8 | 120.6 | A | B |
| COMPARATIVE EXAMPLE 3 | 30 | 70 | −411.2 | 132.9 | A | C |

(58) Field of Classification Search
CPC .......... B23K 35/26; B22F 1/052; B22F 1/103; B22F 1/108; C22C 1/0483; C22C 12/00; C22C 13/00

See application file for complete search history.

FIG. 1

|  | FIRST SOLDER POWDER PART BY MASS | SECOND SOLDER POWDER PART BY MASS | AVERAGE FREE ENERGY (kJ/mol) OF OXIDE FORMATION OF SOLDER POWDER | SOLDER POWDER AVERAGE MELTING POINT (°C) | VISCOSITY CHANGE EVALUATION | MELTABILITY EVALUATION |
|---|---|---|---|---|---|---|
| EXAMPLE 1 | 30 | 70 | -462.2 | 108.9 | A | A |
| EXAMPLE 2 | 15 | 85 | -484.0 | 102.5 | B | A |
| EXAMPLE 3 | 50 | 50 | -432.9 | 117.5 | A | B |
| COMPARATIVE EXAMPLE 1 | 10 | 90 | -491.3 | 100.3 | C | A |
| COMPARATIVE EXAMPLE 2 | 60 | 40 | -418.1 | 121.8 | A | C |
| EXAMPLE 4 | 10 | 90 | -472.3 | 108.3 | B | B |
| EXAMPLE 5 | 15 | 85 | -456.3 | 114.5 | A | B |
| EXAMPLE 6 | 20 | 80 | -440.8 | 120.6 | A | B |
| COMPARATIVE EXAMPLE 3 | 30 | 70 | -411.2 | 132.9 | A | C |

FIG. 2

| OXIDE OF METAL ELEMENT | FREE ENERGY OF OXIDE FORMATION @298.15° K (kJ/mol) |
|---|---|
| $SnO$ | -251.8 |
| $Bi_2O_3$ | -493.7 |
| $In_2O_3$ | -830.7 |
| $Ag_2O$ | -11.2 |
| $CuO$ | -129.5 |

SOLDER PASTE AND BONDED STRUCTURE

TECHNICAL FIELD

The present invention relates to a solder paste for electrically bonding a surface-mount (SMT) component to a circuit board and a bonded structure formed using the solder paste.

BACKGROUND ART

In surface mounting (SMT) of electronic components, generally, a method is adopted in which a solder paste is supplied to a print circuit board by a screen printing method, a dispenser method, or the like, a surface-mount component is mounted on the print circuit board, and the solder is heated and melted using a reflow furnace or the like to electrically bond the component.

The solder paste is produced by stirring and mixing a solder alloy powder and a flux including rosin (pine resin) or a liquid thermosetting resin, an activator such as an organic acid, a viscosity modifier, and the like.

Such a solder paste is required not to deteriorate the meltability of solder powder during reflow even when the solder paste is left to stand in a room temperature environment, and to have a stable viscosity of the paste. As a main factor of lowering the solder meltability in a room temperature environment, an organic acid is consumed by the progress of a reaction in which an oxide film of the solder powder and an organic acid contained in the flux form a salt. When an epoxy resin is contained in the paste, the organic acid salt produced by the above reaction promotes the crosslinking of the epoxy resin, resulting in thickening of the paste.

In order to suppress a reaction between the oxide film of the solder powder and the organic acid in a room temperature environment, for example, PTL 1 proposes that a flux contains a carboxylic acid-based thickening inhibitor having a low dissociation constant and having compatibility with a resin component. PTL 2 discloses a method of coating an activator with a substance decomposed at a soldering temperature higher than a temperature during preheating.

Meanwhile, in order to lower the melting point of the solder alloy, means for adding In may be used. When In is added to the solder alloy, the melting point is lowered, while a free energy of oxide ($In_2O_3$) formation of In at 298.15° K is as small as −830.7 kJ/mol, and In is more easily oxidized than metal elements generally used for solder, such as Sn, Bi, Ag, and Cu. Therefore, a solder powder containing In easily forms an oxide film, and a reaction in which the oxide film of the solder powder and the organic acid contained in the flux form a salt easily proceeds.

CITATION LIST

Patent Literature

PTL 1: Unexamined Japanese Patent Publication No. H5-318176
PTL 2: Unexamined Japanese Patent Publication No. S63-180396

SUMMARY OF THE INVENTION

One aspect of the present invention provides a solder paste including at least two types of solder powders each containing at least two types of metal elements, and in this solder paste, an average free energy of oxide formation of the at least two types of solder powders on a molar basis is −490 kJ/mol or more, the average free energy of oxide formation being a sum of products ($A_i \times B_i$) of a molar ratio ($A_i$) of each of the at least two types of metal elements (i) based on all the at least two types of metal elements constituting the at least two types of solder powders included in the solder paste and a free energy ($B_i$ kJ/mol) of oxide formation of the each of the at least two types of metal elements, and an average melting point of the at least two types of solder powders on a mass basis is 121° C. or lower, the average melting point being a sum of products ($C_j \times D_j$) of a mass ratio ($C_j$) of each of the at least two types of solder powders (j) based on a total mass of the at least two types of solder powders contained in the each solder paste and a melting point ($D_j$° C.) of the at least two types of solder powders.

BRIEF DESCRIPTION OF THE DRAWINGS

FIG. 1 is a table showing evaluation of viscosity change and meltability of a solder paste.

FIG. 2 is a table showing a free energy of metal oxide formation.

DESCRIPTION OF EMBODIMENT

Countermeasures for suppressing the reaction between the solder alloy powder and the flux in a room temperature environment as described in the prior art documents often have a trade-off relationship with the meltability of the solder powder during reflow, and it is desirable to suppress the reaction between the solder alloy powder and the activator in a room temperature environment while the meltability of the solder powder during reflow is desirably secured.

Therefore, the present invention has been made in view of the above-described problems, and an object of the present invention is to provide a solder paste that uses a solder alloy containing a metal element lowering a melting point of an alloy, such as In, and containing an epoxy resin or the like, in which the solder paste can bond at a low temperature and the influence on the meltability of the solder alloy is suppressed even in a room temperature environment, and a mounting structure using the solder paste.

As a result of intensive studies on the above-described problems, according to a first aspect of the present invention, there is provided a solder paste including at least two types of solder powders each containing at least two types of metal elements, and in this solder paste, an average free energy of oxide formation of the solder powder on a molar basis is −490 kJ/mol or more, the average free energy of oxide formation being a sum of products ($A_i \times B_i$) of a molar ratio ($A_i$) of each metal element (i) based on all the metal elements constituting the solder powders included in the solder paste and a free energy ($B_i$ kJ/mol) of oxide formation of the each metal element, and an average melting point of the solder powder on a mass basis is 121° C. or lower, the average melting point being a sum of products ($C_j \times D_j$) of a mass ratio ($C_j$) of each solder powder (j) based on a total mass of the solder powders included in the solder paste and a melting point ($D_j$° C.) of the each solder powder.

In the solder paste of one aspect of the present invention, "at least two types of solder powders" means solder powders different from each other. Therefore, two or more types of metal elements constituting the solder powder may be exactly the same between the solder powders, some of metal elements may be different and the other of metal elements may be the same, or all the metal elements may be different. When two or more types of metal elements constituting each solder powder are the same between solders, the composition of the metal elements is different between the solder powders. Such "at least two types of solder powders" have different properties from each other.

In the solder paste of one aspect of the present invention, when the average free energy of oxide formation of the solder powder on a molar basis is expressed by mathematical formula, the average free energy of oxide formation is as described in Formula (1) below:

[Mathematical Formula 1]

$$\sum_{i=1}^{m} A_i \times B_i \quad (1)$$

In Formula (1) above, m is an integer of at least 2, which is the number of types of metal elements constituting the solder powder included in the solder paste, i is a subscript for distinguishing these metal elements, in which i is 1, 2, 3, . . . , m, $A_i$ is a molar ratio (dimensionless) of the metal element i, $B_i$ is a free energy (kJ/mol) of oxide formation of the metal element i at 298.15° K, and Σ means a sum of products $(A_i \times B_i)$ thereof, that is, $A_1 \times B_1 + A_2 \times B_2 + \ldots + A_m B_m$.

As can be easily understood, the sum of the products described above is, so to speak, an average free energy of oxide formation of the solder powder, which is weighted by a ratio of the number of respective metal elements based on the number of all metal elements constituting the solder powders included in the solder paste, that is, a molar ratio (or atomic ratio). Therefore, in the solder paste of the present invention, the average free energy of oxide formation of the solder powder ≥−490 kJ/mol or more is established. In a preferred aspect, the average free energy of oxide formation of the solder powder ≥−485 kJ/mol or more is established.

In the solder paste of one aspect of the present invention, when the average melting point of the solder powder on a mass basis is expressed by mathematical formula, the average melting point is as described in Formula (2) below:

[Mathematical Formula 2]

$$\sum_{j=1}^{n} C_j \times D_j \quad (2)$$

In Formula (2) above, n is an integer of at least 2, which is the number of types of solder powder included in the solder paste, j is a subscript for distinguishing these solder powders, in which j is 1, 2, 3, . . . , n, $C_j$ is a mass ratio (dimensionless) of the solder powder j, $D_j$ is a melting point (° C.) of the solder powder j, and Σ means a sum of products $(C_j \times D_j)$ thereof, that is, $C_1 \times D_1 + C_2 \times D_2 + \ldots + C_n D_n$.

As can be easily understood, the sum of the products described above is, so to speak, an average melting point of the solder paste, which is weighted by the mass ratio of each solder powder based on the total mass of the solder powders constituting the solder paste. Therefore, in the solder paste of the present invention, the average melting point of the solder powder ≤121° C. is established. In a preferred aspect, the average melting point of the solder powder ≤110° C. is established.

The solder paste of one aspect of the present invention further contains a flux, and the flux removes an oxide film formed on the solder powder.

In one aspect of the solder paste of the aspect of the present invention, the at least two types of solder powders include at least one type of solder powder containing In as the metal element.

In one aspect of the solder paste of the aspect of the present invention, 90 mass % or more of the at least two types of solder powders has a particle size of 20 µm to 45 µm inclusive.

In one aspect of the solder paste of the aspect of the present invention, the solder paste contains an organic acid having a melting point of 60° C. or lower as the flux, and such an organic acid is preferably a compound having an OH group in a molecule.

In one aspect of the solder paste of the present invention, the flux contains a thermosetting resin.

According to a second aspect of the present invention, there is provided a bonded structure formed by bonding electric or electronic components using the solder paste of one aspect of the present invention, for example, a bonded structure in which a substrate electrode and a component electrode are bonded to each other and electrically conducted.

The solder paste of one aspect of the present invention includes two or more types of solder powders having different compositions. In one aspect, two or more types of solder powders may have different compositions even if the metal elements constituting the solder powders are exactly the same between the solder powders. In another aspect, at least one metal element of the metal elements constituting the two or more types of solder powders may be the same between the solder powders.

In a more specific aspect, the metal element constituting the solder powder includes, for example, two types of solder powders, one of which is constituted by a solder alloy (solder alloy α) containing a metal element capable of lowering the melting point such as In, and the other of which is constituted by a solder alloy (solder alloy β) containing a metal element which hardly generates an oxide.

As described above, by combining at least two types of solder powders having different properties, the solder paste of one aspect of the present invention can at least partially combine the properties of both of the solder alloys. That is, when the solder paste of one aspect of the present invention is used, for example, soldering can be performed at a temperature substantially equal to or close to the melting point of the solder alloy α, and the reaction between the solder oxide film and the flux can be suppressed by the presence of the solder alloy β.

Hereinafter, the solder paste of one aspect of the present invention will be described in more detail by specifically describing the solder paste of one aspect of the present invention.

The free energy ($B_i$ kJ/mol) of oxide formation of each metal element constituting the solder powder used in Formula (1) above is at 298.15° K, and is described in, for example, various handbooks. Specifically, values of the standard formation Gibbs energy described in Table 10.127 of KAGAKU BINRAN (Chemical Handbook), Fundamentals, revised 5th edition (edited by the Chemical Society of Japan) can be used. When a plurality of oxides of metal elements are present, a smaller absolute value of the standard formation Gibbs energy is selected as a reference.

As the melting point of the solder powder used in Formula (2) above, for example, information provided from a manufacturer of a solder powder can be used.

The solder paste of the present exemplary embodiment contains a flux component in addition to the solder powders satisfying Formula (1) and Formula (2) above, but may contain other components generally used for constituting the solder paste as necessary in addition to these components.

As the solder powder included in the solder paste of one aspect of the present invention, for example, a solder powder formed of an alloy selected from two groups can be used. As one of the two groups, for example, at least one of solder alloys having various compositions selected from the group consisting of Sn—Bi-based, Sn—Bi—Sb-based, Sn—Ag-based, Sn—Cu-based, Sn—Ag—Cu-based, Sn—Ag—Bi-based, Sn—Cu—Bi-based, Sn—Ag—Cu—Bi-based solder alloys.

As the other of the two groups, for example, at least one of solder alloys having various compositions selected from the group consisting of Sn—In-based, Sn—Bi—In-based, Bi—In-based, Sn—Ag-based, Sn—Ag—Cu-based, Sn—Ag—In-based, Sn—Cu—In-based, Sn—Ag—Cu—In-based, and Sn—Ag—Cu—Bi—In solder alloys. When the constituent elements are the same in both groups, the compositions are different.

In another aspect, solder powders of at least three types of solder alloys may be mixed and used.

The flux component may include, for example, an activator having a function of removing an oxide film formed on the solder powder, such as an organic acid or an amine, a thermosetting resin (for example, an epoxy resin) as a binder for imparting properties of a paste, rosin (pine resin), a solvent, and the like.

As the activator, an organic acid, a halogen salt of an amine, an amine organic acid salt, or the like having a reducing power to remove an oxide film on an electrode as an adherend and an alloy particle surface is used in a temperature range at which heating is performed. Examples of the organic acid include saturated aliphatic monocarboxylic acids such as lauric acid, myristic acid, palmitic acid, and stearic acid; unsaturated aliphatic monocarboxylic acids such as crotonic acid; saturated aliphatic dicarboxylic acids such as oxalic acid, L(-)-malic acid, malonic acid, succinic acid, glutaric acid, adipic acid, pimelic acid, suberic acid, azelaic acid, and sebacic acid; unsaturated aliphatic dicarboxylic acids such as maleic acid and fumaric acid; aromatic carboxylic acids such as phthalaldehyde acid, phenylbutyric acid, phenoxyacetic acid, and phenylpropionic acid; ether-based dicarboxylic acids such as diglycolic acid, and other organic acids such as abietic acid and ascorbic acid. Examples of the halogen salt of an amine include amine hydrochlorides such as ethylamine hydrochloride, diethylamine hydrochloride, dimethylamine hydrochloride, cyclohexylamine hydrochloride, triethanolamine hydrochloride, and glutamic acid hydrochloride, and amine hydrobromides such as diethylamine hydrobromide and cyclohexylamine hydrobromide.

More preferably, an organic acid having a melting point of 60° C. or lower, for example, levulinic acid, pyruvic acid, or acetoacetic acid, and a compound having a melting point of 60° C. or lower and an OH group in a molecule, for example, glycerin or triethanolamine, can be used in combination.

As the thermosetting resin, for example, a liquid epoxy resin can be used. As the epoxy resin, for example, a bisphenol A type epoxy resin, a bisphenol F type epoxy resin, a bisphenol S type epoxy resin, a glycidyl amine type resin, an alicyclic epoxy resin, an aminopropane type epoxy resin, a biphenyl type epoxy resin, a naphthalene type epoxy resin, an anthracene type epoxy resin, a triazine type epoxy resin, a dicyclopentadiene type epoxy resin, a triphenylmethane type epoxy resin, a fluorene type epoxy resin, a phenol aralkyl type epoxy resin, a novolak type epoxy resin, and the like can be used. These may be used alone or in combination of two or more kinds thereof. A solid epoxy resin and a liquid epoxy resin can be combined, but need to be liquid form at 25° C.

As a curing agent used in combination with the thermosetting resin, a compound selected from a group of a thiol-based compound, a modified amine-based compound, a polyfunctional phenol-based compound, an imidazole-based compound, and an acid anhydride-based compound can be used. These may be used alone or in combination of two or more kinds thereof. As the curing agent, a suitable curing agent is selected according to the use environment and use application of the solder paste.

As necessary, an inorganic or organic additive can be used as a viscosity adjusting/thixotropy imparting additive, and for example, silica, alumina, or the like is used in the case of an inorganic additive and a solid epoxy resin, a low-molecular-weight amide, a polyester type, an organic derivative of castor oil, an organic solvent, or the like is used in the case of an organic additive. These may be used alone or in combination of two or more kinds thereof.

The solder paste of one aspect of the present invention described above has a property of having a stable viscosity of the solder paste even in an environment of 25° C., and exhibits moderate meltability at a low temperature, so that conduction can be secured by bonding electronic elements (such as electrodes and electronic components) at a relatively low temperature, a temperature of 120° C. or lower, preferably a temperature of 110° C. or lower. Therefore, one aspect of the present invention provides a bonded structure to which an object is bonded using the solder paste of one aspect of the present invention. One aspect of the present invention also provides a method of bonding an object using the solder paste of one aspect of the present invention.

EXAMPLES

Examples and Comparative Examples

As shown in FIG. 1 below, solder pastes each containing two types of solder powders (a first solder powder and a second solder powder) at various mass ratios were prepared. In Examples 1 to 3 and Comparative Examples 1 and 2, 42Sn-58Bi was used as the first solder powder, and 25Sn-55Bi-20In was used as the second solder powder. In Examples 4 to 6 and Comparative Example 3, 96.5Sn-3Ag-0.5Cu was used as the first solder powder. In all Examples and Comparative Examples, 25Sn-55Bi-20In was used as the second solder powder.

The average free energy of oxide formation according to Formula (1) in FIG. 1 was calculated using the numerical value of the standard formation Gibbs energy ($\Delta G$) (necessary numerical values are extracted and described in FIG. 2 below) described in the above-mentioned KAGAKU BINRAN (Chemical Handbook). The average melting point according to Formula (2) in FIG. 1 was calculated using information on the melting point obtained from the manufacturer of the solder powder.

The viscosity change of the solder paste was evaluated as follows:

After the preparation of the solder paste, the solder paste was left to stand in a freezer at −20° C. for 24 hours or longer to stabilize the viscosity, and then the viscosity of the solder paste after being thawed to normal temperature was defined as the initial viscosity. Next, the viscosity after the paste was stored in a temperature controlled bath at 25° C. for 24 hours was measured, and the viscosity change from the initial stage was evaluated. As a method for measuring the viscosity, a viscosity value after rotation at 5 rpm for 60 seconds using a viscometer (RE550U) manufactured by Told Sangyo Co., Ltd. was adopted. A case where the viscosity change after storage at 25° C. for 24 hours from the initial stage was within 20% of the initial value was evaluated as pass "A", a case where the change was within 20% to 30% of the initial value was evaluated as pass "B", and a case where the change was 31% or more of the initial value was evaluated as fail "C".

The solder meltability was evaluated as follows:

The solder paste was transcribed in a size of a diameter of 6.5 mm and a thickness of 0.2 mm onto a ceramic plate having a thickness of 0.1 mm using a metal mask, the ceramic plate was then heated on a hot plate set at 120° C. for 5 minutes to melt the solder in the transcribed solder paste.

A case where the solder in the transcribed solder paste became one large sphere and solder balls having a diameter of 75 μm or less were not arranged in a semi-continuous annular shape therearound was evaluated as pass "A", a case where the solder became one large sphere and solder balls having a diameter of 75 μm or less were arranged in an annular shape of less than or equal to a semicircle therearound was evaluated as pass "B", and a case where the solder became one large sphere and solder balls having a diameter of 75 μm or less were arranged in an annular shape of larger than a semicircle therearound, a case where solder balls having a diameter of more than 75 μm were generated, or a case where the solder did not become one large sphere was evaluated as fail "C".

Example 1

42Sn-58Bi (melting point: 139° C.) was used as the first solder powder, and 25Sn-55Bi-20In (melting point: 96° C.) was used as the second solder powder. The average particle diameter of both of the solder powders was 20 μm to 30 μm inclusive, and 90 mass % or more of the solder particles had a particle size of 20 μm to 45 μm inclusive.

As the thermosetting resin, "806" manufactured by Mitsubishi Chemical Corporation, which is a bisphenol F type epoxy resin, was used. As the activator for removing the oxide film of the solder powder, a mixture of levulinic acid as a first material and glycerin as a second material was used. In order to accelerate the curing of the epoxy resin, "2P4MHZ" manufactured by SHIKOKU KASEI HOLDINGS CORPORATION, which is an imidazole-based curing agent, was used.

As a method for preparing a solder paste of Example 1, 0.5 parts by mass of a castor oil-based additive (THIXCIN® manufactured by Elementis Japan KK) as a thixotropy imparting agent was added to 20 parts by mass of a bisphenol F type epoxy resin, and the mixture was heated and stirred at 120° C. to dissolve the thixotropy imparting agent and allowed to cool to room temperature. To the mixture, 1 part by mass of an imidazole-based curing agent, 3 parts by mass of levulinic acid, and 1.2 parts by mass of glycerin were added, and the mixture was kneaded for 10 minutes with a vacuum planetary mixer to obtain a resin mixture. Into this resin mixture, 30 parts by mass of the first solder powder of 42Sn-58Bi and 70 parts by mass of the second solder powder of 25Sn-55Bi-20In were added, and the mixture was kneaded for 30 minutes with a vacuum planetary mixer to obtain a solder paste.

The average free energy of oxide formation of the solder powder was calculated as follows. The solder powder included in the solder paste includes 30 parts by mass of the first solder powder of 42Sn-58Bi and 70 parts by mass of the second solder powder of 25Sn-55Bi-20In.

First, the mass ratio of each metal element contained in 30 parts by mass of 42Sn-58Bi solder and 70 parts by mass of 25Sn-55Bi-20In solder is calculated.

Mass ratio of Sn: 0.3×0.42+0.7×0.25=0.301 (30.1 mass %)

Mass ratio of Bi: 0.3×0.58+0.7×0.55=0.559 (55.9 mass %)

Mass ratio of In: 0.7×0.2=0.14 (14.0 mass %)

Next, the molar ratio of each metal element is calculated. Since the atomic weight of Sn is 118.7, the atomic weight of Bi is 209.0, and the atomic weight of In is 114.8, the molar ratio of each metal element in the mixed powder composed of 30.1 mass % of Sn, 55.9 mass % of Bi, and 14.0 mass % or In is as follows:

Sn molar ratio: (30.1/118.7)/(30.1/118.7+55.9/209.0+14/114.8)=0.394

Bi molar ratio: (55.9/209.0)/(30.1/118.7+55.9/209.0+14/114.8)=0.416

In molar ratio: (14/114.8)/(30.1/118.7+55.9/209.0+14/114.8)=0.190

Therefore, the average free energy of oxide formation of the solder powder is 0.394×(−251.8)+0.416×(−493.7)+0.190×(−830.7)=−462.2 kJ/mol from the values in FIG. 2.

The average melting point of the solder powder of Example 1 was calculated as follows. Since the first solder powder of 42Sn-58Bi having a melting point of 139° C. is 30 parts by mass and the second solder powder of 25Sn-55Bi-20In having a melting point of 96° C. is 70 parts by mass, the average melting point of the solder powder of Example 1 is 0.3×139+0.7×96=108.9° C.

The viscosity change of the solder paste of Example 1 after being left to stand at 25° C. for 24 hours was less than 10%, which was regarded as pass "A", and the meltability of the solder was regarded as pass "A" because the solder became one large sphere and solder balls having a diameter of 75 μm or less were not arranged in a semi-continuous annular shape therearound.

Examples 2 to 6 and Comparative Examples 1 to 3

In the same manner as in Example 1, solder pastes of Examples 2 to 6 and Comparative Examples 1 to 3 were prepared by mixing the solder powders shown in FIG. 1 at predetermined ratios, and the viscosity change when the solder paste was stored at 25° C. and the meltability of the solder were evaluated by the same method.

However, in Examples 4 to 6 and Comparative Example 3, 96.5Sn-3Ag-0.5Cu was used as the first solder powder, and the melting point thereof was 219° C. The average particle diameter of the first solder powder was 20 μm to 30 μm inclusive, and 90 mass % or more of the solder particles had a particle size of 20 μm to 45 μm inclusive. Calculation of the average free energy of oxide formation of the metal element of Example 4 is shown below as an example.

The mass ratio of each metal element contained in 10 parts by mass of 96.5Sn-3Ag-0.5Cu solder and 90 parts by mass of 25Sn-55Bi-20In solder is calculated.

Mass ratio of Sn: 0.1×0.965+0.9×0.25=0.3215 (32.15 mass %)
Mass ratio of Ag: 0.1×0.03=0.003 (0.3 mass %)
Mass ratio of Cu: 0.1×0.005=0.0005 (0.05 mass %)
Mass ratio of Bi: 0.9×0.55=0.495 (49.5 mass %)
Mass ratio of In: 0.9×0.2=0.18 (18 mass %)

Next, the molar ratio of each metal element is calculated.

Since the atomic weight of Sn is 118.7, the atomic weight of Ag is 107.9, the atomic weight of Cu is 63.6, the atomic weight of Bi is 209.0, and the atomic weight of In is 114.8, the molar ratio of each metal element in the mixed powder composed of 32.15 mass % of Sn, 0.3 mass % of Ag, 0.05 mass % of Cu, 49.5 mass % of Bi, and 18 mass % of In is as follows:

Sn molar ratio: (32.15/118.7)/(32.15/118.7+0.3/107.9+0.05/63.6+49.5/209.0+18/114.8)=40.54(%)
Ag molar ratio: (0.3/107.9)/(32.15/118.7+0.3/107.9+0.05/63.6+49.5/209.0+18/114.8)=0.42(%)
Cu molar ratio: (0.05/63.6)/(32.15/118.7+0.3/107.9+0.05/63.6+49.5/209.0+18/114.8)=0.12(%)
Bi molar ratio: (49.5/209.0)/(32.15/118.7+0.3/107.9+0.05/63.6+49.5/209.0+18/114.8)=35.45(%)
In molar ratio: (18/114.8)/(32.15/118.7+0.3/107.9+0.05/63.6+49.5/209.0+18/114.8)=23.47(%)

Therefore, the average free energy of oxide formation of the solder powder composed of 40.54 mol % of Sn, 0.42 mol % of Ag, 0.12 mol % of Cu, 35.45 mol % of Bi, and 23.47 mol % of In is 0.4054×(−251.8)+0.0042×(−11.2)+0.0012×(−129.5)+0.3545×(−493.7)+0.2347×(−830.7)=−472.3 (kJ/mol) using the values in FIG. 2.

Regarding the average melting point of the solder powder, since the first solder powder of 96.5Sn-3Ag-0.5Cu having a melting point of 219° C. is 10 parts by mass and the second solder powder of 25Sn-55Bi-20In having a melting point of 96° C. is 90 parts by mass, the average melting point of the solder powder of Example 1 is 0.1×219+0.9×96=108.3° C.

The same calculation was performed for other Examples and Comparative Examples.

From the results of Examples 1 to 6 and Comparative Examples 1 to 3 in FIG. 1, it is found that when the average free energy of oxide formation of the solder powder is −490 kJ/mol or more and the average melting point of the solder powder is 121° C. or lower, the results of the viscosity change of the solder paste when being stored at 25° C. for 24 hours and the meltability of the solder at 120° C. are both acceptable. The viscosity change of the solder paste at 25° C. is caused by the reaction of the oxide of the solder alloy with the organic acid contained in the flux to form a salt, which is correlated with ease of formation of the metal oxide. It is considered that as the metal oxide is less likely to be generated, the viscosity change is less likely to occur, and according to one aspect of the present invention, it has been found that when the average free energy of oxide formation of the solder powder (more specifically, the average free energy of oxide formation of the metal element of the solder powder) is −490 kJ/mol or more, the solder paste has excellent viscosity stability.

In the case of a solder paste including two or more types of solder powders, when at least one type of solder powder is melted, even in a case where the other solder powder is not melted, since the melted solder and the surface of the other solid solder powder are compatible with each other in a preferred aspect, the solder paste may exhibit appropriate meltability even if all the solder powders are not melted. It has been found that when the solder paste of one aspect of the present invention is heated at 120° C., the average melting point of the solder powder is 121° C. or lower, and thus the solder paste has excellent solder meltability.

INDUSTRIAL APPLICABILITY

The solder paste of one aspect of the present invention has properties of capable of bonding at a low melting point and having a stable viscosity of the solder paste even in an environment of 25° C., and is useful as a solder paste for component mounting, a mounting structure mounted using the solder paste, and the like.

The invention claimed is:

1. A solder paste comprising at least two types of solder powders each containing at least two types of metal elements,
wherein
the solder paste has an average free energy of oxide formation of the at least two types of solder powders on a molar basis of −490 kJ/mol or more, the average free energy of oxide formation being a sum of products ($A_i×B_i$) of a molar ratio ($A_i$) of each of the at least two types of metal elements (i) based on all the at least two types of metal elements constituting the at least two types of solder powders included in the solder paste and a free energy ($B_i$ kJ/mol) of oxide formation of the each of the at least two types of metal elements, and
the solder paste has an average melting point of the at least two types of solder powders on a mass basis of 121° C. or lower, the average melting point being a sum of products ($C_j×D_j$) of a mass ratio ($C_j$) of each of the at least two types of solder powders (j) based on a total mass of the at least two types of solder powders included in the solder paste and a melting point ($D_j$° C.) of the each of the at least two types of solder powders.

2. The solder paste according to claim 1, wherein the at least two types of solder powders include at least one type of solder powder containing In as one type of the at least two types of metal elements.

3. The solder paste according to claim 1, wherein 90 mass % or more of the at least two types of solder powders has a particle size of 20 μm to 45 μm inclusive.

4. The solder paste according to claim 1, further comprising a flux component, the flux component containing an organic acid having a melting point of 60° C. or lower.

5. The solder paste according to claim 4, wherein the flux component contains a compound having a melting point of 60° C. or lower and an OH group in a molecule.

6. The solder paste according to claim 4, wherein the flux component contains a thermosetting resin.

7. A bonded structure comprising a substrate electrode and a component electrode bonded to each other using the solder paste according to claim 1.

* * * * *